Oct. 14, 1958  R. HAUBURSIN  2,856,448
STORAGE BATTERIES
Filed Nov. 18, 1954  2 Sheets-Sheet 1
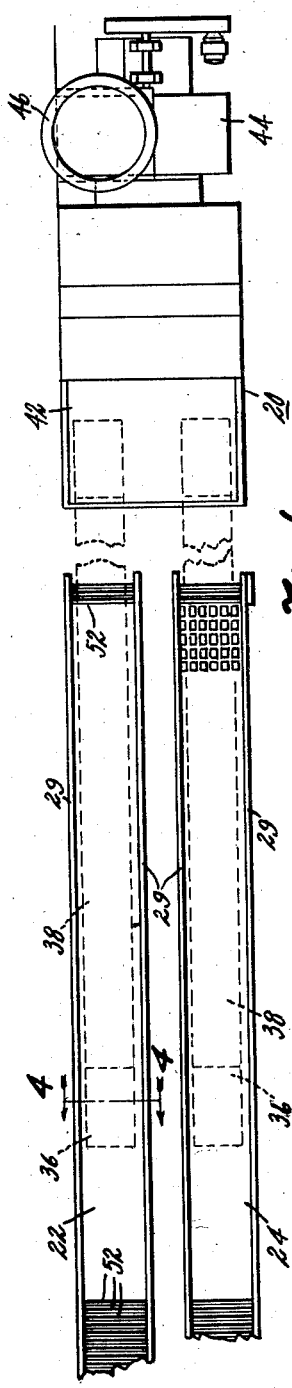
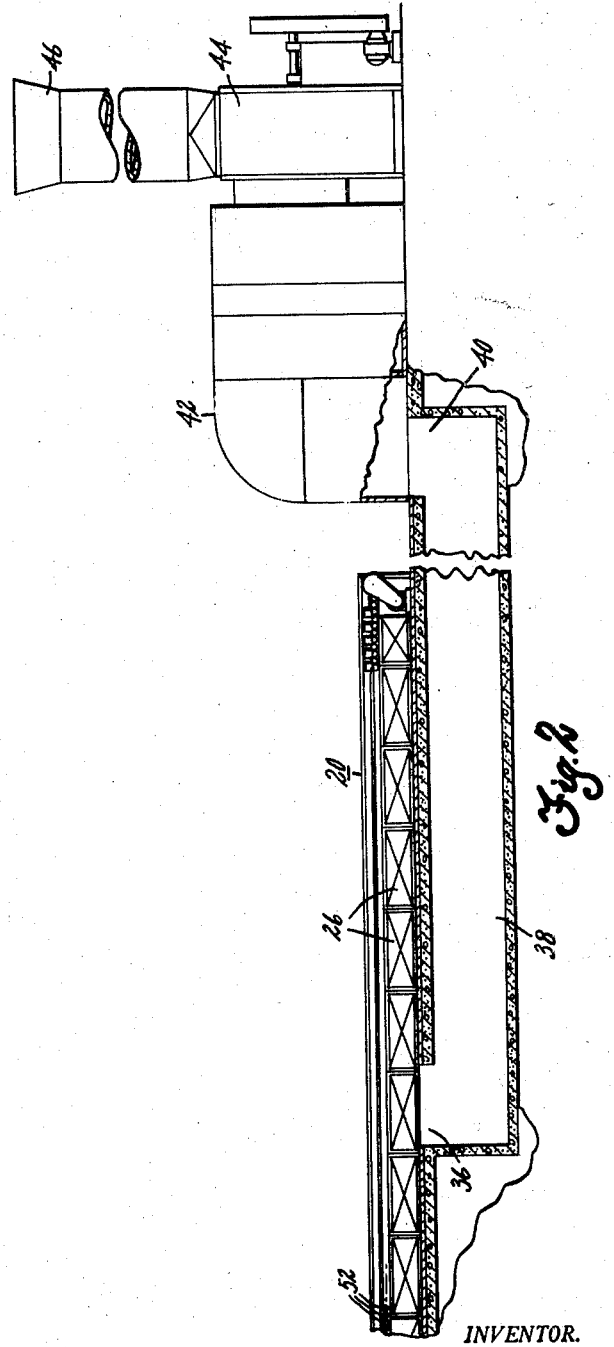
INVENTOR.
RICHARD HAUBURSIN
BY
HIS ATTORNEY Oct. 14, 1958  R. HAUBURSIN  2,856,448
STORAGE BATTERIES
Filed Nov. 18, 1954  2 Sheets-Sheet 2
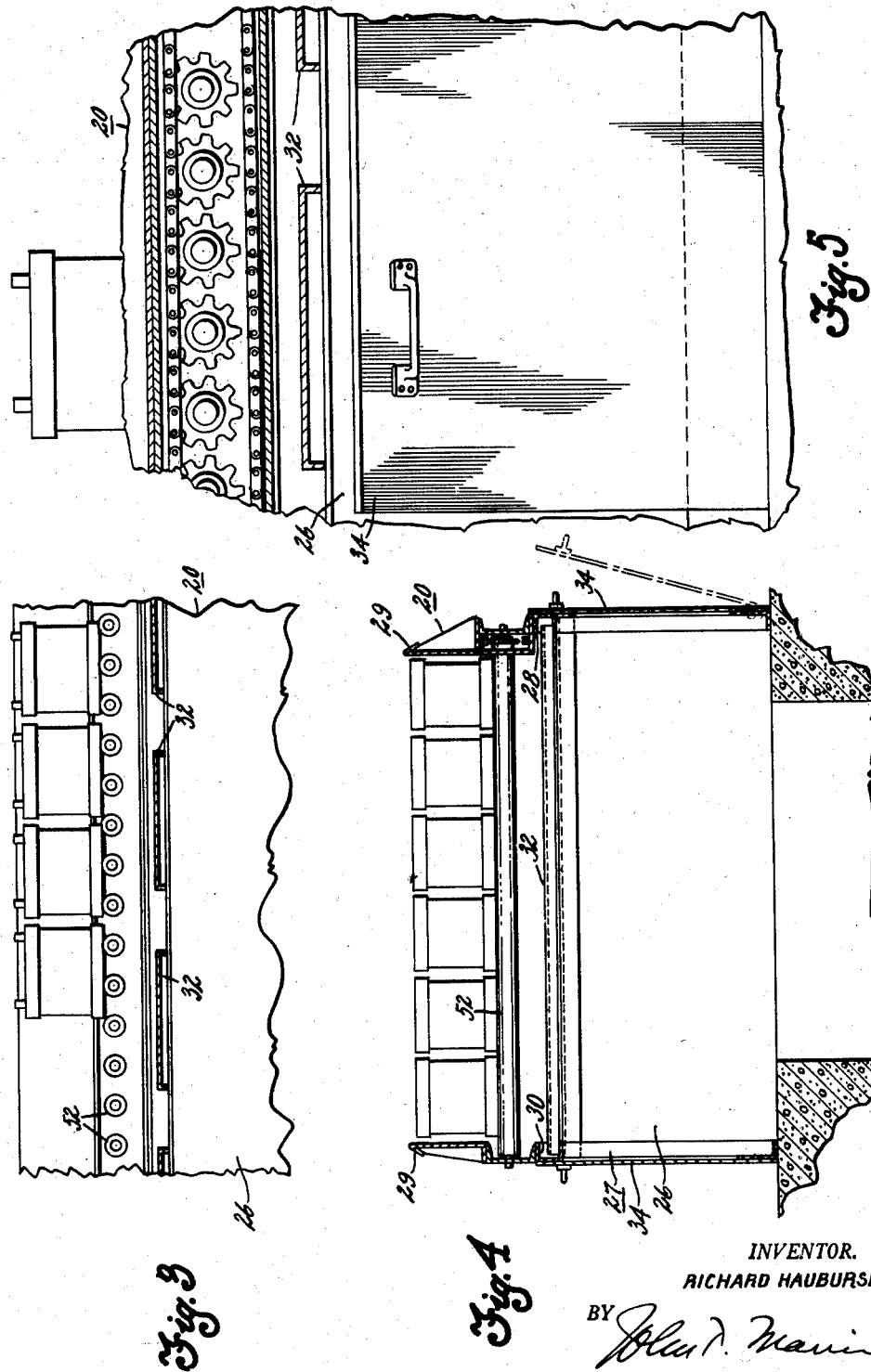
INVENTOR.
RICHARD HAUBURSIN
BY
HIS ATTORNEY

United States Patent Office

2,856,448
Patented Oct. 14, 1958

2,856,448

STORAGE BATTERIES

Richard Haubursin, Muncie, Ind., assignor to General Motors Corporation, Detroit, Mich., a corporation of Delaware Application November 18, 1954, Serial No. 469,758

5 Claims. (Cl. 136—33)

This invention relates to storage batteries and is particularly concerned with a method and apparatus for use in the charging of Faure type storage batteries.

It is an object of this invention to provide an apparatus and method for charging storage batteries wherein the charging rate may be increased due to the maintenance of reduced ambient temperature conditions in the atmosphere immediately surrounding the battery.

Another object of the invention is to provide an apparatus for use in the charging of storage batteries wherein the plurality of batteries are supported upon a support during the charging period and wherein air is drawn downwardly around the batteries at a predetermined rate of flow for maintaining reduced temperature conditions immediately adjacent the batteries and for simultaneously removing obnoxious fumes and acid mist from the atmosphere and carrying the fumes and mist to a point of exhaust remote from the batteries.

It is a still further object of the invention to provide means for absorbing the fumes and acid mist and thereby prevent the exhausting of said fumes and mist into the surrounding atmosphere.

Another object of the invention is to provide a downdraft charging rack for lead-acid storage batteries wherein a conveyor is utilized for supporting a plurality of batteries which conveyor is apertured or perforated so that air can be drawn therethrough. Immediately beneath the conveyor a plenum chamber is provided with suitable baffles to maintain substantially uniform air flow around the batteries. The plenum chamber is connected to a duct which is in turn connected to the intake of a blower system through suitable filters. In this manner, when the blower system is operated, air is drawn downwardly around the batteries through the plenum chamber, duct and filters and is exhausted on the outlet side of the blower system.

The charging of storage batteries has always presented a major problem of atmospheric contamination. When batteries of the lead-acid type are being charged, a mist of sulphuric acid is exhausted into the air of the charging room which acid laden air is then exhausted into the atmosphere surrounding the plant. This acid mist has a rather obnoxious, acrid odor and has a rather undesirable effect on paint, etc., on dwellings and factories in the immediate area.

This condition has been aggravated by the use of fast charging processes for example, as disclosed in Patent No. 2,637,836, assigned to the assignee of the present invention. These fast charging processes are very useful since they increase the capacity of a given plant through a reduction in charging time and in general produce better batteries. However, in the use of the fast charging processes, the period of charge is limited by the temperature obtained by the battery being charged and when said batteries are maintained on the conventional skid in close proximity to one another, it is difficult to maintain the temperature of the electrolyte at a reasonable temperature without periodic resting of the batteries through cessation of the charging procedure. These rest periods increase the overall time required for a full charge.

The present invention eliminates the objection to fast charging processes and concurrently enhances their use through the reduction of the temperature of the batteries during charging to a point where a rest period is not necessary. The present invention accomplishes these improvements without the use of refrigerating apparatus or expensive water cooling devices, etc.

Further objects and advantages of the present invention will be apparent from the following description, reference being had to the accompanying drawings, wherein a preferred form of the invention is clearly shown.

In the drawings:

Figure 1 is a plan view of the charging apparatus;

Figure 2 is a sectional view of one of the charging racks shown in Figure 1 together with the cooling system;

Figure 3 is an enlarged fragmentary view of a portion of the charging rack and plenum chamber with the side covering removed;

Figure 4 is a section taken on line 4—4 of Figure 1; and

Figure 5 is an enlarged fragmentary view of the conveyor showing one type of conveyor which may be used and also of the baffles as used in the plenum chambers.

Referring specifically to the drawings, a charging rack and ventilating apparatus 20 is shown in Figure 1 which shows two conveyor systems 22 and 24 each of which is adapted to receive and carry a plurality of batteries which may be set upon the conveyor progressively as the conveyor moves until such time that the first batteries placed thereon reach the right hand end of the conveyor whereupon the conveyor is stopped and will be completely filled with batteries. These batteries are then suitably connected to a source of current. At this point the charging cycle may be started.

Directly beneath each conveyor are identical plenum chambers 26 which extend the entire length of the conveyor. These plenum chambers are elongated box-like structures formed from sheet metal secured in any desired manner to a frame 27. Along each side of the frame 27 and extending upwardly therefrom are side walls 29 which serve as confining means to aid in directing air flow. The walls 29 are of sufficient height to extend to the top of the batteries in conveyors 22 and 24. Spaced a desired distance below the conveyor are opposed rails 28 and 30 which are used to support a plurality of sheetlike baffles 32. The baffles 32 are longitudinally slidable upon the rails 28 and 30 so that they may be pushed to any desired position and spaced for controlling the downdraft of air passing therearound. The adjustment of the baffles may be accomplished through doors 34 provided at one or both sides of the plenum chamber as shown in Figures 4 and 5 to obtain uniform air flow around the batteries for causing uniform cooling thereof. These doors are hinged at one side thereof and may be fastened in closed position after the adjustment of the baffles 32 is completed.

Substantially, intermediate the ends of each plenum chamber 26 is an opening 36 which connects with a longitudinally extending duct 38 that passes beneath one-half of the plenum chamber. This duct, in a large scale installation, is a concrete duct formed in the floor of the charging room. At the end of the duct 38 opposite to the opening 36 is a second opening 40 which connects with a filter chamber 42 of a blower 44. The blower is of the exhaust type whereby air is drawn through the duct 38 and through filter 42.

The filter 42 may be comprised of a plurality of units including a scrubbing chamber wherein water sprays and baffles act upon the exhausted air to remove acid mist therefrom in a plurality of steps. After the exhausted air is thoroughly scrubbed, it passes through the blower mechanism 44 and out the exhaust stack 46 into the atmosphere surrounding the plant.

It will be observed from Figures 1 and 3 that the batteries are spaced rather closely together on the conveyor which may be a chain type conveyor, as noted in Figure 5 which is supported upon a plurality of laterally disposed rollers 52, carried by the framework 28. Since the batteries are spaced in close proximity, it is apparent that when the blower 44 is operating that air is drawn downwardly around the batteries and that this air is substantially uniformly distributed therearound through proper placement of the baffles 32. Thus, all of the batteries upon the conveyor or conveyors are cooled at a substantially uniform rate.

We have found that by using this type of cooling system that it is possible to impose a fast charge upon the batteries without the necessity of periodic rest periods whereby the time consumed in charging the batteries is considerably reduced, thereby increasing the productive capacity of any single charging unit.

It is apparent that the rate of air flow around the batteries may be regulated through the size and the speed of the blower 44 to obtain the desired temperature control of the batteries during the charge and in this connection the blower system should be adequate to maintain the desired temperature during the hot summer months when ambient temperature is relatively high. Thus, the device should be designed so as to have a capacity sufficient to maintain the temperature of the batteries being charged at a temperature not to exceed 200° F. when the ambient temperature stands at about 100° F. If this capacity is designed into the unit, it is apparent that by varying the speed of the blower or by use of by-pass techniques within the system, it will be possible to maintain the batteries to be charged at a uniform temperature by merely varying the volume of air exhausted by the blower.

After the batteries are fully charged, the conveyor is again operated and the batteries are progressively removed therefrom while a new set of batteries is being positioned on the conveyor at the opposite end. Thus, the conveyor is intermittently used to position the batteries on the rack and to discharge them therefrom.

By using this system and apparatus, it is possible to decrease the fast charging period from substantially 22 to 24 hours to a period of approximately 14 to 16 hours which makes it possible to charge approximately 33% more batteries with the same charging apparatus in any 24 hour period than was possible prior to the use of this invention.

It is apparent that the blower system in accordance with its capacity, may be used to cool batteries on two or three or more conveyor systems and that in the case of more than one conveyor system, suitable dampers may be provided for cutting off exhaust ducts which are not in use, these expedients being conventional modifications in connection with air flow apparatus.

It is understood also that all of the metals used in the racks, plenum chambers, etc., should be resistant to acid corrosion either through use of suitable alloys or through acid resistant coverings or coatings since it is quite apparent that when charging batteries, at a temperature in the order of 200° F., there will be considerable acid mist in th effluent atmosphere which will be highly corrosive.

While the embodiment of the present invention as herein disclosed, constitutes a preferred form, it is to be understood that other forms might be adopted.

What is claimed is as follows:

1. In an apparatus for substantially uniformly controlling the temperature of a plurality of lead-acid storage batteries during the charging thereof, the combination comprising; an elongated rack adapted to receive and support a plurality of storage batteries in closely spaced position thereon, said rack being freely permeable to air flow therethrough, confining means associated only with the longitudinal sides of said rack and extending upwardly therefrom so as to form a chamber with the rack which is open at the top thereof, a closed chamber beneath said rack and extending substantially the full length thereof, a single exhaust duct connected at one end thereof to said chamber and to a source of suction at the other end thereof, and a plurality of independently movable baffles disposed within said chamber and spaced between said rack and said exhaust duct for regulating air flow around said batteries, whereby said source of suction draws air substantially uniformly downwardly around said batteries as directed by said confining means and said baffles.

2. In an apparatus for substantially uniformly controlling the temperature of a plurality of lead-acid storage batteries during the charging thereof, the combination comprising; an elongated rack open at the top thereof to the surrounding atmosphere and adapted to receive and support a plurality of storage batteries in closely spaced position thereon, said rack being freely permeable to air flow therethrough, a closed chamber beneath said rack and extending substantially the full length thereof, a single exhaust duct connected to said chamber at one end thereof and to a source of suction at the other end thereof, and a plurality of independent slidably movable baffles disposed within said chamber and spaced in substantially parallel relation to the rack and disposed between said rack and said exhaust duct for regulating air flow around said batteries by relative slidable movement in a given plane into and out of proximity with one another, whereby said source of suction draws air substantially uniformly downwardly around said batteries as directed by said baffles.

3. An apparatus for substantially uniformly controlling the temperature of a plurality of lead-acid storage batteries during the charging thereof, comprising; an elongated air permeable conveyer adapted to receive a plurality of batteries in closely spaced position thereon, a rack, a plurality of rollers journaled on said rack upon which said conveyer is movably supported, confining means along the longitudinal sides only of said conveyer and rack and extending upwardly from said rack adjacent the sides of batteries on said conveyor to form a chamber with the rack which is open at the top thereof, a closed plenum chamber beneath said conveyer and substantially within said rack and extending the full length of the conveyer, a single outlet duct from said plenum chamber positioned substantially intermediate the ends thereof, a suction source remote from said conveyer, said duct connecting said plenum chamber and said suction source, and a plurality of independent baffles within said plenum chamber and beneath said conveyer and independently slidable longitudinally on portions of said rack for controlling the flow of air through said chambers and for regulating air flow around said batteries, whereby said air source draws air substantially uniformly downwardly around said batteries as directed by said confining means and said baffles.

4. The apparatus as claimed in claim 3 wherein a scrubber is positioned between said duct and said suction means.

5. In a method for controlling the temperature of a plurality of lead-acid storage batteries during the charging cycle, the steps comprising; positioning a plurality of batteries in uniform closely spaced arrangement with respect to one another upon a permeable support, confining the space immediately below the support which carries said plurality of batteries, mechanically exhausting air from said confined space by creating a forced draft for drawing air downwardly around said batteries through said confined space, baffling the air in said confined space so that the air flow around each battery is substantially uniform and equal, and limiting the rise in temperature of said batteries during the charging cycle by adjusting the volume of air drawn downwardly around said batteries.

(References on following page)

References Cited in the file of this patent

UNITED STATES PATENTS

| | | | |
|---|---|---|---|
| 1,592,078 | Cano | July 13, 1926 |
| 1,605,345 | Hawkins | Nov. 2, 1926 |
| 1,888,573 | Sadwith | Nov. 22, 1932 |
| 2,052,545 | Bishop et al. | Sept. 1, 1936 |
| 2,101,571 | Breisch | Dec. 7, 1937 |
| 2,149,813 | Lindstrom | Mar. 7, 1939 |
| 2,173,736 | Thomas | Sept. 19, 1939 |
| 2,341,628 | Koweindl | Feb. 15, 1944 |